Figure 1:
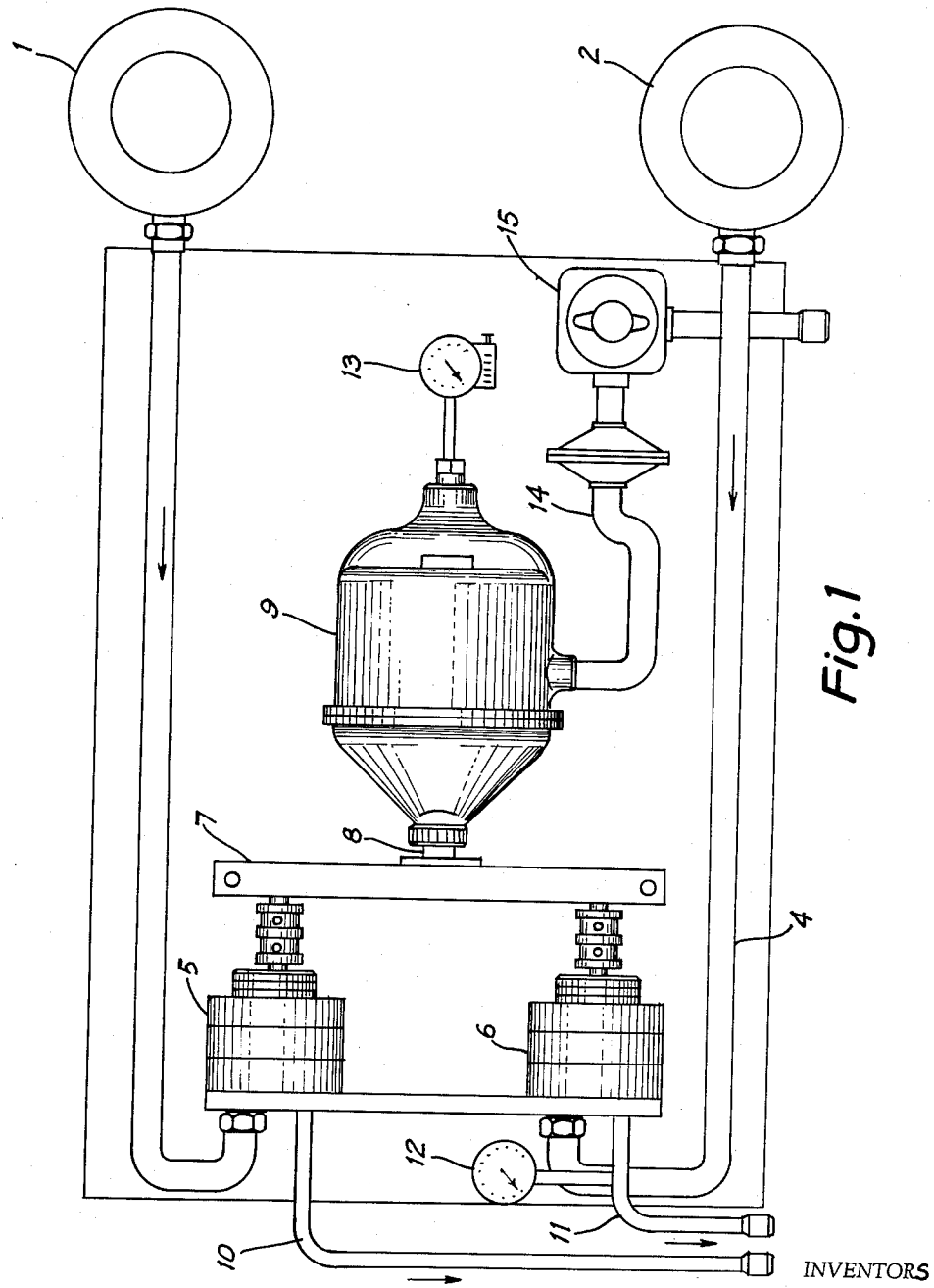

INVENTORS
WALTER GUGEL
FRITZ JOACHIM TONNE

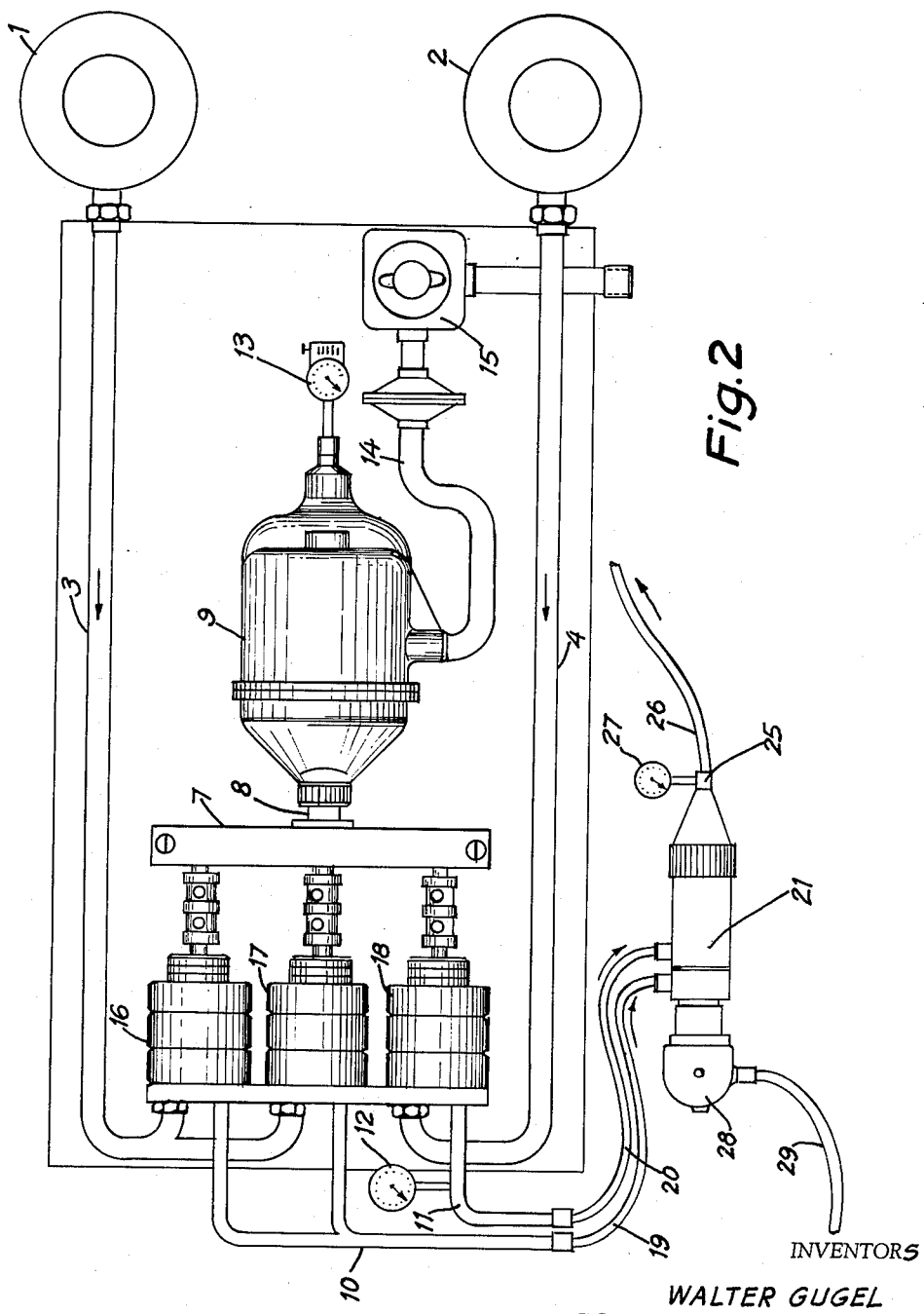

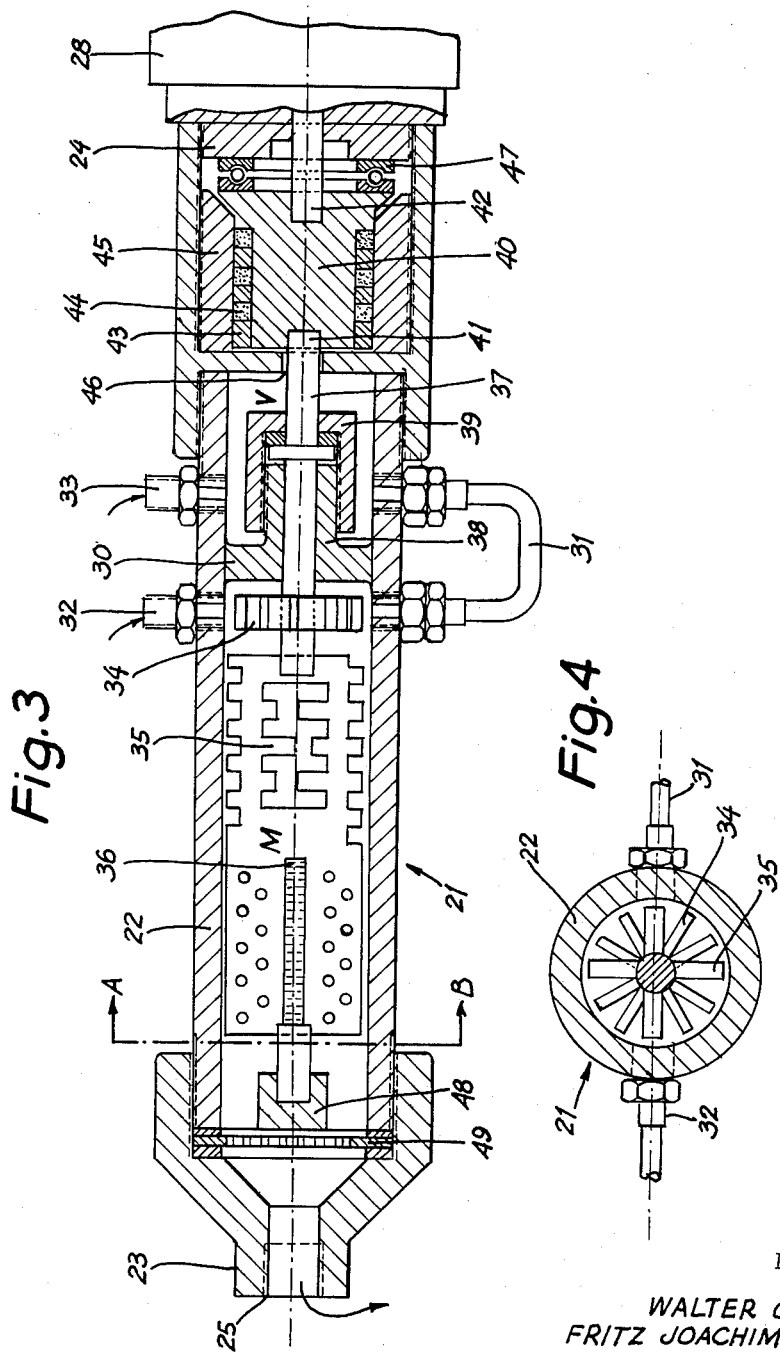

United States Patent Office 3,214,144
Patented Oct. 26, 1965

3,214,144
APPARATUS AND METHOD FOR THE APPLICATION OF MULTIPLE COMPONENT RESINS
Walter Gugel, Kamen, Westphalia, and Fritz Joachim Tonne, Werne an der Lippe, Germany, assignors to Schering Aktiengesellschaft AG, Berlin, Germany
Filed July 10, 1963, Ser. No. 294,466
Claims priority, application Germany, July 19, 1962, Sch 31,769
9 Claims. (Cl. 259—7)

The present invention relates to the application of multiple component resins into open or closed hollow spaces, more particularly, to an apparatus and method for withdrawing, mixing and forcing multiple component resins into open and closed hollow spaces under high pressure.

On various occasions it is desired to fasten together irregularly shaped materials particularly those which have fine fissures or fractures, or contain hollow spaces that are difficult to reach. This fastening has been accomplished by injection multiple component resins into these spaces. Various forms of materials can be fastened together in this manner, including natural materials such as rocks, and minerals (salt, coal, etc.), and prepared materials such as concrete, masonry, etc. With prepared materials it may be specifically desired to seal cracks or crevices or to join preformed parts to each other.

Examples of stones which may require sealing are various forms of sedimentary rocks whose natural structure contains cracks of fissures, or whose structure may have sustained such damage as a result of pressure, settling, shifting, or working. Such rocks may occur either on the surface or underground. On the surface these rocks may occur as hanging or recumbent formations, exposed deposits of coal in steeply inclined strata, or salt formations which might have been partially leached out by water. Above ground the stones may have suffered damage from earthquakes or from settling of the earth. Similar damages can also be suffered by artificial structures and appear as cracks in buildings, retaining walls, foundations, pavements and roadways of masonry or concrete.

As far as is known, no satisfactory procedure or apparatus has been devised for injecting multiple component resins in open or closed hollow spaces in the materials and structures as described above.

It is therefore the principal object of the present invention to provide a novel and improved apparatus and method for the application of multiple component resins into open and closed hollow spaces.

For application in the particular situations as described above, the method of the present invention is generally carried out under pressure. In every case, however, the mixing of the resin components is accomplished under pressure so that the components are intimately mixed without the presence of bubbles. The process of this invention can be used for the casting of various forms and shapes such as commutator segments and wide extrusion nozzles used in the manufacture of laminated fabrics.

The method of the present invention essentially comprises withdrawing the resin components from sources of supply, delivering these components and then dispensing the components into the hollow spaces under the required pressure by the use of motor driven high pressure gear pumps. Prior to injection in the spaces the components are mixed in a high pressure mixing unit for multiple component resins and the resin mixture is then poured through a flexible conduit through an injection nozzle into the hollow spaces.

The apparatus of the present invention has all of the following characteristics which are necessary for successful application of multiple component resins into open and closed hollow spaces:

(1) Generation of higher pressures for mixing the resin components.
(2) Maintenance of such sigh pressures and the application of these pressures for the injection of the resin mixture.
(3) Satisfactory feeding of the component resins to the pump mixing unit and injection nozzle.
(4) Continuous and dependable operation
(5) Ready accessibility to the parts that have been in contact with the resins to provide for convenient cleaning thereof.

The apparatus of the present invention essentially comprises a plurality of motor driven high pressure gear pumps which are connected to sources of supply of the resin components. The pumps are then connected through pressure equalizing chambers to a high pressure mixing unit which in turn has an outlet conduit with an injection nozzle on the end thereof for applying the mixture to the hollow spaces to be treated. All of the high pressure gear pumps can be driven from the same motor through a variable transmission whereby individual gear pumps can be driven at different speeds in order to vary the proportions of the components of the mixture.

A modification of this apparatus may be used for the resin having two components in the ratio of 2:1. This modification comprises three high pressure gear pumps of equal capacities, with two of the pumps delivering one resin component while the third pump delivers the other component. All three pumps are connected by high pressure conduits with a mixing unit through pressure equalizing chambers if necessary.

Other objects and advantages of the present invention will be readily apparent upon reference to the accompanying description when taken in conjunction with the following drawings wherein—

FIGURE 1 is a top plan view of the apparatus of the present invention but not showing the mixing unit;
FIGURE 2 is a view similar to that of FIGURE 1, but showing a modification of the apparatus;
FIGURE 3 is a longitudinal sectional view of the mixing unit employed with the arrangement of the present invention; and
FIGURE 4 is a transverse sectional view of the mixing unit taken along the line AB of FIGURE 3.

In the description of the specific embodiment and modification of the present invention reference will be made to the drawings wherein like reference symbols indicate the same parts throughout the various views.

Proceeding to FIGURE 1, the arrangement illustrated somewhat schematically therein comprises a pair of pressurized containers 1 and 2 which are the sources of supply for the resin components. These containers 1 and 2 are connected by high pressure conduits 3 and 4 which comprise plastic tubes and threaded couplings to high pressure gear pumps 5 and 6 having identical capacities. These high pressure gear pumps are of the type capable of delivering pressures ranging from 50 to 400 atms. over prolonged periods of time.

While the gear pumps 5 and 6 have identical capacities, the proportions in which the two components are mixed can be varied by the substitution of gears in a transmission gear box 7 which is driven by an output shaft 8 of a variable speed electric motor 9. The gear pumps 5 and 6 have a capacity of 10 cm.$^3$/rev. and are rotated at a speed of about 80 r.p.m. by the motor 9.

The discharge sides of the gear pumps 5 and 6 are connected by high pressure conduits 10 and 11 to a high pressure mixing unit as shown in FIGURE 2 and illustrated in greater detail in FIGURES 3 and 4. The conduits leading to the mixing unit can be as long as desired since the resin components are not mixed together until they enter the high pressure mixing unit.

Since gear pumps can conventionally handle materials wholly below a certain viscosity, it may be necessary to warm very viscous resin components in order that these resins are brought down to the required viscosity range. This can be done by heating the containers. Such heating is especially important with resins that contain fillers.

Conduit 11 has a manometer 12 attached thereto which not only indicates the pressure of the fluid that is being pumped but also provides for automatically de-energizing or disengaging the motor 9 when the discharge pressure from the pumps rises to a predetermined limit.

The motor 9 is provided with a recording tachometer 13 which indicates both the instantaneous speed of the motor and also the total number of revolutions. Recording of the total number of revolutions provides an accurate indication of the quantity of mixture being delivered.

If the resin components do not contain any volatile, combustible solvents, electric motors can be used for driving the gear pumps which are not explosion proof. However, in most applications it would be desirable to use explosion proof electric motors with the electric wiring connecting the motor to a source of electrical energy being housed in a conduit 14 passing through an explosion proof electric switch 15.

In order that two-component resin mixtures such as epoxy or polyester resins may have their components mixed in widely varying proportions, both gear pumps are driven through an infinitely variable speed transmission with a single control rod common to both gear pumps so that their speeds can be controlled in unison without changing their speed ratio.

Proceeding next to FIGURE 2, there is illustrated a modification particularly adapted for a resin mixture having two components in the ratio of 2:1. This modification similarly comprises containers 1 and 2, but three identical high pressure gear pumps 16, 17 and 18 are provided. The major component of the mixture is contained in container 1 and is delivered through conduit 3 to the supply sides of gear pumps 16 and 17, while the minor component of container 2 is delivered through the conduit 4 to the supply side of the gear pump 18.

The three gear pumps 16, 17 and 18 have the same capacities and are driven at the same speed through a transmission 7 and an electric motor 9. These pumps have delivery volumes of 10 cm.³/rev. and are driven at speeds of 20 to 80 r.p.m. which correspond to a delivery of 35 to 145 kilograms per hour.

The discharge sides of the gear pumps 16 and 17 are connected to the high pressure conduit 10 and the discharge side of the gear pump 18 is connected to the high pressure conduit 11. The conduits 10 and 11 are in turn connected to high pressure flexible conduits 19 and 20 which lead to a high pressure mixing unit 21. Since the two resin components are not mixed until they have been delivered to the mixing unit 21, the flexible conduits 19 and 20 can be as long as possible.

The modification of employing 3 pumps to deliver two resins has the following advantages.

(1) It permits the use of pumps with the same characteristic curves so that the mixture which is to be produced by the pumps collectively will have the same composition regardless of the pump speeds.

(2) The pumps can be arranged radially about a single power shaft for simplifying the construction.

(3) Using 3 pumps of identical construction will reduce to a minimum the number of parts that must be kept for replacement or repair purposes.

The high pressure mixing unit 21 is illustrated in detail in FIGURES 3 and 4, and comprises a strong walled cylinder 22 having internally threaded end fittings 23 and 24. The end fitting 23 has an outlet 25 to which is connected a flexible nozzle 26 on the end of which is an injection outlet or nozzle, not shown. The discharge outlet 25 is provided with a manometer 27 which may be used in injection molding or casting.

The fitting 24 has mounted thereon an electric driving motor 28 which is connected through a flexible electrical conduit 29 to a suitable source of electrical energy.

Within the cylinder 22 is a transverse partition 30 which divides the cylinder into a mixing chamber M and a vestibule V which is connected to the mixing chamber M by means of a by-pass conduit 31.

The mixing chamber M is further provided with a hose connection 32 and the vestibule V with a similar hose connection 33 for connection to the high pressure conduits 19 and 20 leading from the pumps and for delivering to the mixing unit, for example, a synthetic resin at 32, and a hardener at 33.

The mixing chamber M comprises a rotatable mixing member having a star-shaped distributing wheel 34 and a rotary agitator whose rear half 35 has cut-out portions and whose front half 36 has radial fins with perforations. A shaft 37 connects the distributing wheel and the agitator with the driving motor 28. The shaft 37 rotates in a bearing 38 mounted in the transverse wall 30 with the bearing being provided with a stuffing box 39, if necessary.

The shaft 37 from the driving motor 28 passes through a high pressure packing before entering the vestibule V. This high pressure packing comprises a rotatable cylindrical portion 40 with two rectangular couplings 41 and 42, for drivingly connecting the shaft 37 to the motor 28. On the outer periphery of the cylindrical part 40 there are mounted alternately but not fastened, rings 43 of steel and intermediate rings 44 of polytetrafluoroethylene. These rings have substantially square cross-sections. The cylindrical part 40 rotates in a stationary bearing 45 of bronze.

The fluid pressure from the vestibule V is transmitted through a bore 46 along the shaft 37 to the cylindrical part and upon the packing rings 43 and 44. The part 40 cannot be forced out because it has its end engaging against a thrust bearing 47 while the loose steel rings 43 seal off a polytetrafluoroethylene ring 44 against the inner wall of the bearing 45.

At the discharge end of the mixing chamber M there is an insert 48 for properly centering the free end of the mixing member, but provided with openings to enable the resin mixture to pass through. Between the cylinder 22 and the end cap 23 there is mounted a perforated plate 49.

A check valve can be provided in the mixing unit between the vestibule V and the mixing chamber M to prevent any of the mixture from flowing back into the vestibule since such a mixture in the vestibule may cause operating difficulties.

By separating the mixing chamber from the remainder of the apparatus it is possible to use the apparatus in surroundings where otherwise its use would not be possible. By delivering the components separately to the mixing chamber the major portion of the apparatus can be kept at a convenient distance from the working place. Since only the mixing chamber will come into contact with the cross-linkable mixture, the cleaning of the apparatus will be greatly facilitated. At the end of the operation the mixing chamber is either rinsed with water or washed with a suitable single component solvent.

In carrying out the method of the present invention, particularly in stone having widely distributed fissures in large numbers, the number of borings will have to be made whose depth will depend on the nature of the material. In order to effectively seal off the borehole against the material to be injected, the injection tube may carry an adjustable packer, the borehole may be provided with an adjustable cone which may form part of a cut-off valve, or it may be in the form of a ball check valve. The connection with the injection tube can be in the form of a simple screw thread or in the form of a bayonet joint. The present injection can be combined with anchoring the tension anchor which is to be fastened to the borehole either by expansion or by sealing, and provided by the above-described cone through which the injection is effected. After the injection has been completed, the anchor is loosened and removed.

If large individual cracks or fissures occur, as in the concrete slab of a pavement or foundation, the injection can be performed in the following manner:

The crevice is sealed off superficially with an organic or an inorganic sealing malterial. An opening is left for the subsequent injection and also, if necessary, an outlet opening. The multiple component resin is then injected into the opening. This method can also be used for cementing previously prepared construction material blocks.

The withdrawing of the resin components from the sources of supply, the dosing of the component resins and delivering of these dosed resins to the mixing unit are carried out under high pressures. Further, the resin components are mixed under high pressures in the mixing units and then applied to the spaces under high pressure.

Thus it can be seen that the present invention provides a highly effective method and apparatus for applying accurately multiple component resins into open spaces in various materials and structures.

It will be understood that this invention is susceptible to modification in order to adapt it to different usages and conditions and, accordingly, it is desired to comprehend such modifications within this invention as may fall within the scope of the appended claims.

What is claimed is:

1. In combination an apparatus for the application of a mixture of multiple component resins into open or closed spaces, comprising a plurality of high pressure gear pumps with said plurality of gear pumps corresponding to a plurality of resin components, a motor drivingly connected to said plurality of gear pumps to drive the same, conduits connecting the supply sides of said pumps to sources of supply of the resin components, high pressure conduits connected to the discharge sides of said pumps, a high pressure mixing unit having interconnected a first chamber and a second chamber, said first chamber connected to a portion of said high pressure conduits, said second chamber connected to the remainder of said high pressure conduits, for mixing said components prior to application thereof; said mixing unit having an outlet with a flexible injection nozzle connected thereto, and an injection outlet at the end of said flexible nozzle for applying the resin mixture to hollow spaces.

2. An arrangement for the application of multiple component resins into open or closed spaces, and comprising a plurality of high pressure gear pumps with the plurality of gear pumps corresponding to the plurality of resin components, a motor drivingly connected to said plurality of gear pumps to drive the same, conduits connecting the supply sides of said pumps to sources of supply of the resin components, high pressure conduits connected to the discharge sides of said pumps, a high pressure mixing unit, said mixing unit having a mixing chamber therein connected to a portion of said high pressure conduits, a shaft extending into said mixing chamber with a rotary mixing member on said shaft within said mixing chamber, means on one end of said mixing unit for driving said mixing shaft, a second chamber within said mixing unit separate from said mixing chamber, connected to the remainder of said high pressure conduits for conveying a component thereto prior to entering said mixing chamber said component at a higher pressure than the other component, conduit means connecting said mixing chamber and said second chamber, there being an outlet on the other end of said mixing unit and a flexible nozzle connected thereto, and an injection outlet at the end of said flexible nozzle for applying the mixed component resins to hollow spaces.

3. An arrangement for the application of multiple component resins into open or closed spaces, and comprising a plurality of high pressure gear pumps with the plurality of gear pumps corresponding to the plurality of resin components, a motor drivingly connected to said plurality of gear pumps to drive the same, conduits connecting the supply sides of said pumps to sources of supply of the resin components, high pressure conduits connected to the discharge sides of said pumps, a high pressure mixing unit connected to said high pressure conduits for mixing said components prior to application thereof, said mixing unit having a mixing chamber therein, a shaft extending into said mixing chamber with a rotary mixing member on said shaft within said mixing chamber, means on one end of said mixing unit for driving said mixing shaft, a second chamber within said mixing unit separate from said mixing chamber where said component is at a higher pressure than the other component, there being an outlet on the other end of said mixing unit and a flexible nozzle connected thereto, an injection outlet at the end of said flexible nozzle for applying the mixed component resins to hollow spaces, and a pressure bearing within said mixing unit journalling said mixing shaft and having a series of rings of square cross-section with said rings being alternately of deformable and relatively rigid materials.

4. An arrangement for the application of multiple component resins as claimed in claim 3, wherein said deformable material is polytetrafluorethylene.

5. An arrangement for the application of a two component resin whose components are in the ratio of 2:1 into open or closed hollow spaces, and comprising first, second and third high pressure gear pumps of equal capacities, a variable speed motor drivingly connected to said gear pumps for driving said pumps at equal speeds, first and second containers with each container having a resin component therein, first and second conduits connecting the supply sides of said first and second pumps to said first container, a third conduit connecting the supply side of said third pump to said second container whereby two pumps are supplied with the major component and the third pump with the other component, a first high pressure conduit connected to the discharge sides of said first and second pumps, a second high pressure conduit connected to the discharge side of said third pump, a high pressure mixing unit connected to said high pressure conduits for mixing said components prior to application thereof, said mixing unit having an outlet with a flexible nozzle connected thereto, and an injection outlet at the end of said flexible nozzle for applying the resin mixture to hollow spaces.

6. A method of applying multiple component resins into open and closed hollow spaces comprising:
   (a) supplying a plurality of resin components;
   (b) distributing each of said components under high pressure;
   (c) admitting a portion of said pressure distributed components of (b) to a first chamber;
   (d) admitting the remainder of said pressure distributed components of (b) to a second chamber;
   (e) mixing the contents of said first and second chambers under high pressure; and
   (f) forcing the mixed resin components of (e) into hollow spaces under high pressure.

7. The method of claim 6, wherein the high pressure of (b) is within the range of about 50 to 400 atmospheres.

8. A method of applying a two component resin whose components are in the ratio of 2:1 into open or closed hollow spaces comprising:
   (a) supplying a first resin component to a first and second high pressure pump;
   (b) supplying a second resin component to a third high pressure pump, said first, second and third pumps having the same capacity;
(c) distributing each of said components under high pressure;
(d) admitting the pressure distributed component of said first and second high pressure pumps to a first chamber;
(e) admitting the pressure distributed component of said third high pressure pump to a second chamber;
(f) mixing the contents of said first and second chambers under high pressure; and
(g) forcing the mixed resin components of (f) into hollow spaces under high pressure.

9. The method of claim 8, wherein the high pressure of (c) is within the range of about 50 to 400 atmospheres.

References Cited by the Examiner
UNITED STATES PATENTS

| 2,764,565 | 9/56 | Hoppe et al. | 259—7 |
| 3,008,808 | 11/61 | Hodges | 259—8 |

CHARLES A. WILLMUTH, *Primary Examiner.*